United States Patent Office 3,076,594
Patented Feb. 5, 1963

3,076,594
APPARATUS FOR PRODUCING CORRECTED PROGRAMMING DEVICES FOR AUTOMATIC CONTROL
Richard A. Weinberg, R.D. 1, Pittstown, N.J.
Filed Feb. 25, 1959, Ser. No. 795,469
1 Claim. (Cl. 234—26)

This invention relates to the recordation of data on permanent records or programming devices for automatic control of externally programmed apparatus and more particularly to an apparatus and method for reproducing or combining on a single permanent record or programming device information or control instructions recorded on a plurality of existing external programming devices.

The advent of automatic control or "automation" and self-regulating mechanisms for controlling automatic machines has revolutionized many industries and may well herald what has been called a "second industrial revolution." The "lifeblood" of automatic control is information. To receive and act on information is the essential of every control system that has been or will be devised from the simplest to the most complex. It follows that the automatic control of a machine is no better than the input control information, instructions, and commands or messages received by the machine. Accordingly, it is readily apparent that the input information must be free of errors and must remain free during the control operations.

While much has been done to maintain the input information free of errors, once applied to a machine, during the control operations by improving the reliability of the control signals or information, as for example, by correcting discrepancies by feedback to the control elements, often done continuously, and by such techniques as reducing the probability of error by the use of redundancy and signal sampling; still little has been done to preclude the possibility of error being introduced into the information received by a machine through the input operating commands from the control system. The data input into an automatically controlled machine may contain errors and to date permanent records of input-data, such as external programming devices containing the information requirements of the machine to be controlled for the various operations must be laboriously manually reproduced or corrected. As for example, tapes having errors must be either completely reproduced or the portions having errors must be removed, and "corrected" portions spliced in manually.

It is a principal object of the present invention to provide a simple, inexpensive system for automatically producing a single external programming device embodying only the correct data input for a machine, translated from a programming device having errors in the data and a programming device having corrections thereto, without need of time-consuming manual operations for reproducing the correct data on the new permanent record or programming device.

Another object of the invention is to provide a system for reproducing the intelligence or information on a plurality of recording mediums or programming devices of a given type on to a recording medium of another type, as for example, from a perforated tape to a magnetic tape or vice versa.

A feature according to the invention is that a permanent record or external programming device, as for example a tape, known to have errors and another permanent record or second tape having corrections to the errors in the first mentioned tape are simultaneously sensed by interpretive-command elements operationally controlling a translating apparatus, for example, a tape perforator which translates the information on the two tapes on to a third tape, thereby producing or punching a single corrected third tape embodying all of the instructions which are correct in the tape known to have errors and the corrected instructions or input data on the second tape having the corrections.

The tapes or external programming devices from which a new and correct programming device is to be made are provided with a coded table of commands thereon corresponding to the sequence in which instructions on the tapes, as well as what instructions, are to be combined on a single tape and a separate code representative of operational control instructions to be supplied to the automatically controlled machine. It being understood that the last-mentioned "code" is a text of control instruction and whatever symbols or code is employed is not a single code but a text or message which is on the device with each "code element" on the device being sensed being representative of one or more "symbols" of the text of a message or control instructions. These individual "symbols," of course, can be letters of the alphabet or a number etc. The tape embodying the corrections for the errors in the tape whose information is to be corrected can be provided with two series of commands, a first series which corresponds to the commands on the first tape and a second series of coded signals or coded commands for initiating the translation of information on it to the new corrected third tape at the proper time while precluding the information on the first tape having errors from being translated onto the new tape.

Through the coded commands a selector unit is actuated for transferring command of the translator or tape perforator from one interpretive-command element to the other, i.e., from one tape to the other, so that the translator or translating apparatus can punch-out a new tape with the operational control instructions combined, from the two input tapes, in a sequence such that only the correct control information is embodied thereon.

Other features and advantages of the system in accordance with the present invention will be better understood as described in the following specification and dependent claim, in conjunction with the following drawings in which FIG. 1 is a block diagram of a pneumatic system according to the invention.

Figure 1:
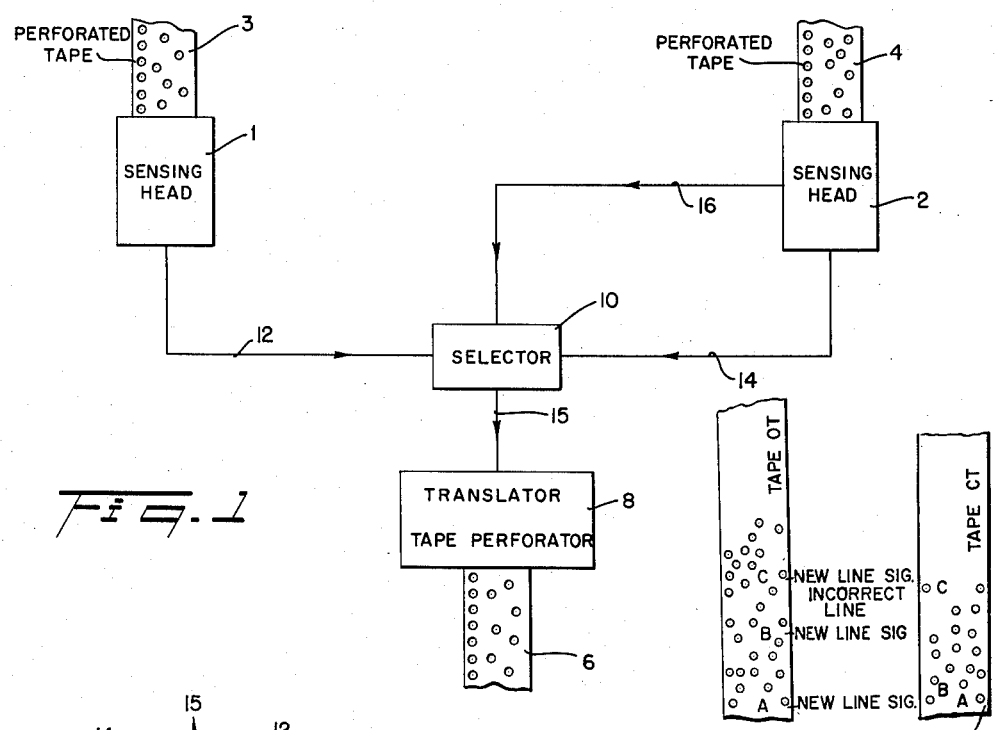
FIG. 1a is a fragmentary diagram of a pair of tapes for illustrating operation of the pneumatic system illustrated in FIG. 1.

While described hereinafter as primarily usable for producing a corrected tape the present invention is also usable to simply combine information on a single tape from a plurality of tapes.

The system according to the invention shown in the drawings comprises a pair of interpretative-command elements comprising sensing heads 1 and 2 for sensing punched tapes 3 and 4 respectively. It will be understood that tape 3 is a tape having holes or perforations coded and representative of control instruction for externally programming or controlling a machine. This tape 3 has errors and tape 4 has corrections for these errors so that only correct input data from tape 3 is to be combined with the correct data or instruction on tape 4. The sensing heads 1 and 2 are of the known pneumatic type for sensing coded perforations on perforated tapes or ribbons and may be constructed as a single unit or separate heads. The tape 4 is provided with holes corresponding to coded commands for controlling the sequence in which the coded operational information on the two tapes is to be embodied in a new or third tape 6 punched out or otherwise perforated by a translating apparatus such as a tape perforator 8.

The translator 8, which may be a standard keyboard perforator, is operationally controlled by the sensing heads 1 and 2 through a selector 10. The translator is provided with control signals from the heads transmitted to it through a plurality of air paths shown diagrammatically (FIG. 1) as single paths 12 and 14 from the sensing heads 1 and 2 respectively, and from selector 10 through a plurality of paths diagrammatically shown as a single path 15, it being understood that the sensing heads are suitably connected to an air source, not shown.

In order to control the sequence in which the coded control instructions on tapes 3 and 4 are transcribed or translated on to the single new and corrected tape 6 the selector 10 shifts operational control to either of the sensing heads in response to command air signals transmitted through a control circuit 16 as later herein described.

Figures 2, 3:
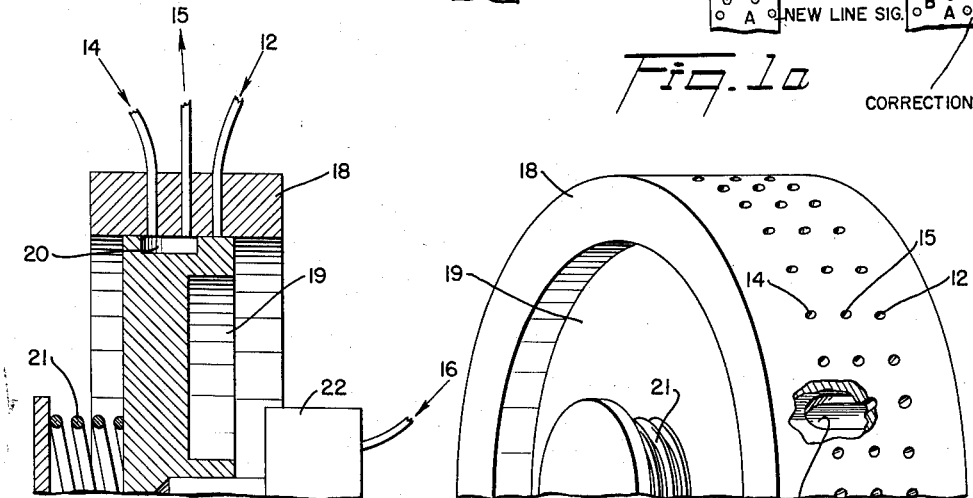
FIG. 2 is a sectional side view of the selector device shown in FIG. 1.
FIG. 3 is a perspective view showing the control paths, for the air from the selector shown in FIG. 2, to the translator shown in FIG. 1.

It will be understood that the various air paths 12, 14 and 15, or the number thereof is provided in dependence upon the number of perforation code positions on the tapes 1 and 4. Thus, for example, if a tape information code consists of thirty-two holes or perforation positions thirty-two paths must be provided from each individual sensing head to the selector 10 and thirty-two paths from the selector 10 to the translator 8. Accordingly, the valve selector device 10 of FIG. 1 is constructed as shown in FIG. 2 and comprises a housing 18 and a valve element 19 reciprocal therein. The valve element 19 is provided (FIGS. 2 and 3) with a plurality of peripherally spaced passageways 20 used for providing communication between the sensing heads 1, 4 and the translator 8 in dependence upon the position of the valve element 19. The element 19 is constantly biased in a direction toward the right, opposite to the position shown in FIG. 2 by a spring 21 thereby to maintain the sensing head 1 in communication with translator 8 through passageways 20 and through individual and separate paths 12, 15 for each code message or signal to be translated from tape 3 on to tape 6. It being understood that the number of holes or paths 12, 14, 15 correspond to the number of possible perforations across the width of the tapes.

Whenever information is to be transcribed from tape 4 on to tape 6 the sensing head 2, which is continuously reading the command code on tape 4 in known manner, transmits through a command code perforation an air signal through path 16 actuating an air cylinder 22 overcoming the force of spring 21 and moving the element 19 to the left to place the sensing head 2 in communication with the translator 8 through passageways 20 and air paths 14 and 15. Thus, the perforator 8 is placed under operational control of sensing head 2, i.e., under control of tape 4. Once the necessary correct information on tape 4 is transcribed on tape 6 the command code on tape 4 allows the air cylinder 22 to be deenergized so that the spring 21 shifts the element 19 to the right and shifts operational control of perforator 8 to sensing head 1, i.e., tape 3. It will be understood that both tapes 3 and 4 are continuously sensed simultaneously and are therefore continuously fed through their associated or respective sensing heads.

In order to better understand the manner in which the tapes 3 and 4 function for transferring the selector from sensing head to sensing head will be described with respect to two tapes 3 and 4. Sensing head 1 transmits all information from tape 3 through selector 10 to translator 8 until an error appears and this is coded in the correction tape 4. The means of transferring the selector from sensing head 1 to sensing head 2 will be described using as an illustration two sample tapes (see FIG. 1a). It might be well to note that the codes used in the tapes have no bearing on this system. In every system of coding, there is some signal used to indicate the beginning or end of a message. A message might be a line of copy when talking of the tape used in the printing industry, Teletype, Western Union, etc. A message might be a series of instructions to a computer to perform particular operations. In any event, this correction device does not correct a single code but actually corrects messages.

Figure 1A:
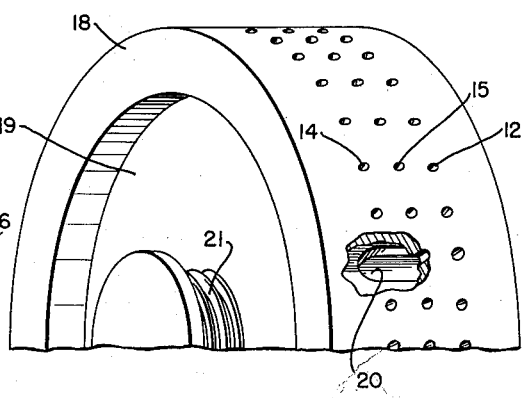

In the illustration in FIG. 1a tape OT is the original tape and tape CT is the correction tape. Each message is alphabetically labeled for identification purposes only. As indicated A in tape OT and tape CT is the code representing the beginning (or end) of a message. Tape OT would transmit the message since CT did not indicate an error and tape CT would only move one space. The B message is incorrect and, therefore, tape CT will have a code which indicates a correction must be made. The code will actuate the selector 10 and though tape OT is moving through sensing head 1, the selector is only transmitting signals from sensing head 2. When the next message appears in the sensing head 1, it is held until C appears in the sensing head 2. If the C message signal on tape CT is correct, it turns over the selector to sensing head 1. The sensing heads 1 and 2 must sense at the same time the code signal for a message before they will be actuated and they will always stop whenever it senses the next signal for a message. This acts as an interlock and thereby synchronizes the movement of the tapes.

Until both sensing heads sense a signal for a message, they will not operate. Once in operation, they will continue until they sense the next signal for a message.

It is apparent that the tape can be a material with holes, magnetic ink, magnetic recording, etc., as long as the appropriate sensing heads and translator are used. When going from one form of recording to another, a cross bar switch, not shown, or convertor must be used for translating from one method or coding to another. Standard commercial equipment is available for this use and it is not the purpose of this invention to claim translating or converting equipment.

The selector 10 may be constructed so as to be operated solely electrically in an embodiment not shown. In such an embodiment the valve element 19 is actuated by two solenoids wherein one solenoid replaces the spring 21 and the second solenoid replaces air cylinder 22 for actuating element 19 to positions for placing the paths from sensing heads 1 and 2 in communication with the translator 8. In this translator construction both tapes 3 and 4 require command codes and the tape 4 has two series of codes. One command series is similar to that of tape 3 and the second series of commands places the translator under control of tape 4. So long as the code commands on the tapes 1 and 4 indicate that the information to be translated on to tape 6 should come from tape 3, the second solenoid connected opposite to a solenoid similar to air cylinder 22 will remain energized through a circuit from head 1 to the selector to maintain the valve element 19 in the proper position. In the event that corrected information or control instructions are to be translated on to tape 6 from tape 4 a command signal is transmitted from tape 4 energizing the solenoid similar to air cylinder 22 and deenergizing the second solenoid (not shown) displacing valve element 19 in a direction toward the left, in a position similar to FIG. 2, to place individual passageways 20 in a position to provide communication from the passageways between sensing head 2 and the translator so that the translator is then under operational control of sensing head 2 and the corrected information on tape 4 is then transcribed or translated on to the corrected or new tape 6. Once the immediate information has been transcribed or translated on to tape 6 the first solenoid is deenergized and the second solenoid is energized shifting operational control of the translator from sensing head 2 back to sensing head 1 in response to command signals transmitted to the selector 10. In this manner it can be seen that a simple system is provided by the present invention for economically and rapidly producing new tapes embodying the corrected input data to be provided to an automatically controlled machine.

According to the invention, the system can be constructed for translating information from two magnetic tapes onto a third magnetic tape or to a perforated tape and from two perforated tapes onto a magnetic tape as hereinafter described. Thus, the system can be constructed (FIGS. 4 and 5) with sensing heads 1', 2' constructed as pick-up heads effectively sensing magnetic tapes 3', 4' having intelligence thereon to be translated or recorded onto a third magnetic tape 6'. One of the magnetic tapes, as for example tape 4', is provided with coded command signals for switching a translator 8' constructed as a recording head from one magnetic pick-up 1', 2' to the other through a selector 10'.

The selector 10' is constructed as a switch having a blade contact 24 normally providing a closed path between circuits 12' and 15' so that the information or intelligence on tape 3' is normally recorded on magnetic tape 6'. Whenever the command signals on tape 4' indicate that information on tape 4' rather than tape 3' is to be recorded on magnetic tape 6' a pick-up head 25, in sensing head 2', reading the coded command instructions will energize a solenoid 26 actuating the switch blade 24 into an operative position shown in dotted lines in FIG. 5 thereby opening the circuit between pick-up head 1' and recording head 8' and closing a circuit 14', 15' so that recording head 8' records information from magnetic tape 4' picked up through pick-up head 2'.

Figure 4:
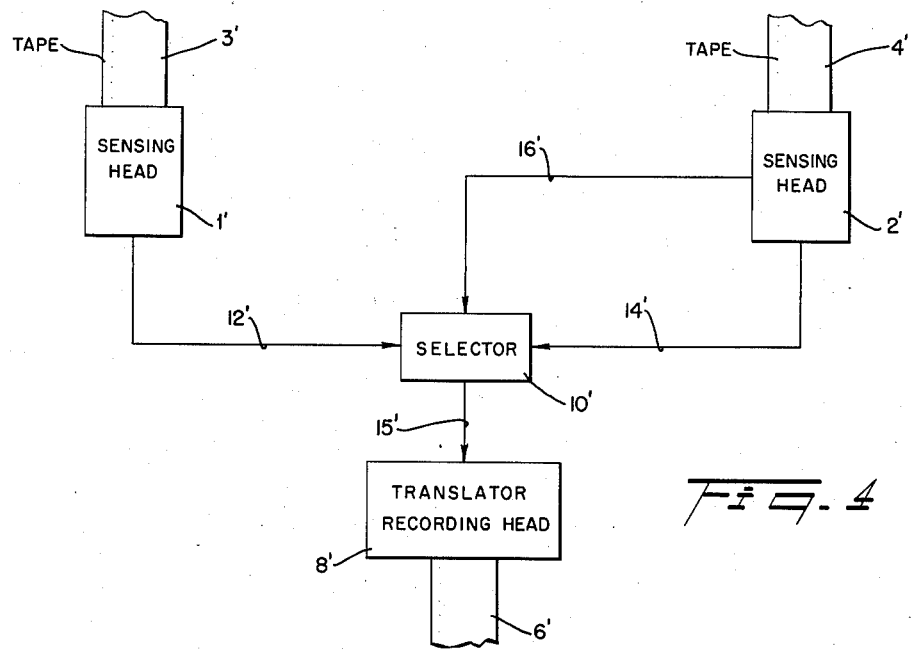
FIG. 4 is a block diagram of an electrical system according to the invention.
Figure 5:
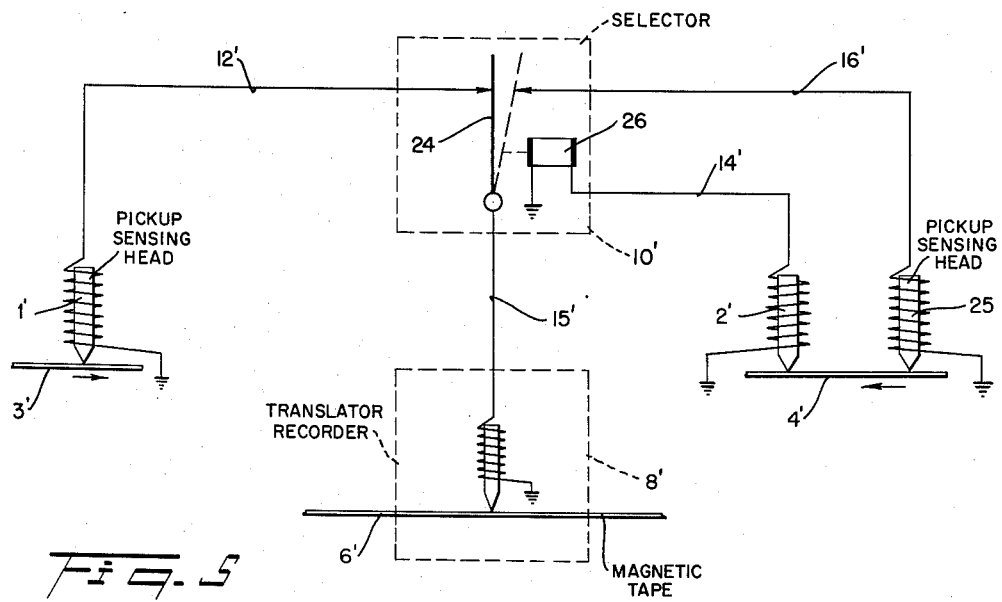
FIG. 5 is a schematic diagram of the system shown in FIG. 4.

It will be understood by those skilled in the art that magnetic sensing heads 1' and 2', shown in FIGS. 4 and 5, can be replaced with a standard teletype or commercial control perforated tape sensing head which would convert the perforations in perforated tapes replacing magnetic tapes 3' and 4', to an electrical signal. Using such an arrangement and a translator in the manner shown in FIG. 5 it is quite easy to convert information on perforated tapes into electrical signals and translate it onto a magnetic tape 6'. Moreover, if information on magnetic tapes is to be recorded on perforated tapes magnetic pick-up head 1', 2' can actuate a recorder 8' of the type capable of perforating a tape under control of electrical signals so that information on magnetic tapes can be translated onto a perforated tape.

While preferred embodiments of the invention have been shown and described it will be understood that many modifications and changes can be made within the scope of the invention.

What I claim and desire to secure by Letters Patent is:

In an apparatus for reproducing and combining on a single record tape the instructions on a plurality of record tapes for externally programming automatically controlled machines, the tapes whose instructions thereon are to be combined having holes corresponding to a coded table of commands for controlling which instructions and the sequence in which the instructions on the tapes are to be combined on the single record tape and holes corresponding to a separate code representative of operational control instructions to be supplied to an automatically controlled machine, said apparatus having tape sensing means for sensing and interpreting the coded commands and for separately sensing the codes representative of the instructions on each of said tapes, a tape perforator operatively controlled by the tape sensing means for perforating holes in the single tape corresponding to the coded instructions on said plurality of tapes, the improvement which comprises a control system operably connected to said interpretative-command elements and said translating means comprising means defining a plurality of separate air paths between the sensing means and the tape perforator, a source of air pressure connected to the sensing means, selector means under control of the sensing means for controllably connecting and interrupting the air flow in selected air paths between the sensing means and the perforator in response to the coded commands on the tapes to transfer command of the tape perforator from one record tape to the other in response to coded commands transmitted from the sensing means thereby combining the instructions of said plurality of record tapes on the single record tape in a given sequence in dependence upon the predetermined coded commands of the individual record tapes.

References Cited in the file of this patent

UNITED STATES PATENTS

| | | |
|---|---|---|
| 2,711,794 | Ghertman | June 28, 1955 |
| 2,788,886 | Paulding et al. | Apr. 16, 1957 |
| 2,850,095 | Royden | Sept. 2, 1958 |